US010997622B2

(12) United States Patent
Awad

(10) Patent No.: US 10,997,622 B2
(45) Date of Patent: May 4, 2021

(54) ENCRYPTION-BASED VALIDATION OF COUPONS

(71) Applicant: SAP SE, Walldorf (DE)

(72) Inventor: Alain Awad, Scottsdale, AZ (US)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 16/125,547

(22) Filed: Sep. 7, 2018

(65) Prior Publication Data

US 2020/0082426 A1    Mar. 12, 2020

(51) Int. Cl.
G06Q 30/02    (2012.01)
H04L 9/30    (2006.01)

(52) U.S. Cl.
CPC ........... *G06Q 30/0225* (2013.01); *H04L 9/30* (2013.01); *G06Q 2220/00* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 8,316,237 B1 * | 11/2012 | Felsher | ................. | H04L 9/0825 713/171 |
| 2007/0150339 A1 * | 6/2007 | Retter | .................... | G06Q 30/06 705/14.26 |
| 2013/0091002 A1 * | 4/2013 | Christie | ................. | G06Q 30/02 705/14.26 |
| 2014/0074578 A1 * | 3/2014 | Bergdale | ................ | G07B 15/00 705/14.26 |
| 2014/0297382 A1 * | 10/2014 | Chiussi | ............. | G06Q 30/0225 705/14.26 |
| 2016/0294826 A1 * | 10/2016 | Han | .................... | H04L 63/0823 |

(Continued)

FOREIGN PATENT DOCUMENTS

WO    WO 02/065371 A1 *    8/2002    ............. G06F 19/00

OTHER PUBLICATIONS

T. Shojima; Y. Ikkai; N. Komoda, A method for mediator identification using queued history of encrypted user information in an incentive attached P2P electronic coupon system (English), 2004 IEEE Inter Conf on Systems, Man and Cybernetics (IEEE Cat. No. 04CH37583) (vol. 1, p. , Jan. 1, 2004 (Year: 2004).*

(Continued)

*Primary Examiner* — Marilyn G Macasiano
(74) *Attorney, Agent, or Firm* — Klarquist Sparkman, LLP

(57) ABSTRACT

Technologies are described for generating and validating encrypted coupons. For example, an encrypted coupon can be received. The encrypted coupon can be decrypted using a public key. The decrypted coupon can be decoded (e.g., using a pre-defined data format) to extract coupon data comprising a unique coupon identifier and a unique user identifier. The decrypted coupon can be validated based at least in part upon the unique coupon identifier and the unique user identifier. The process of receiving the encrypted coupon, decrypting the encrypted coupon, decoding the decrypted coupon, and validating the decrypted coupon can be performed offline (e.g., without access to external networks or the internet) and without accessing information indicating associations between unique coupon identifiers and unique user identifiers.

15 Claims, 6 Drawing Sheets

(56) References Cited

U.S. PATENT DOCUMENTS

2017/0372289 A1* 12/2017 Fitzsimmons .......... H04L 67/02

OTHER PUBLICATIONS

"Mobile Coupons with QR Codes," http://qrd.by/qr-code-coupon, 15 pages, accessed Sep. 7, 2018.
"Using Personalized QR Codes in Email Marketing," Getting Personal (/blog), http://purlem.com/blog/2012/04/using-personalized-qr-codes-in-email-marketing/, 5 pages, accessed Sep. 7, 2018.
"How to Validate the Coupons and Promotional Codes You Give Away in Promotions," easypromosblog, http://www.easypromosapp.com/blog/en/2014/03/how-to-validate-the-coupons-and-promotional-codes-you-give-away-in-promotions/, 7 pages, accessed Sep. 7, 2018.

* cited by examiner

ENCRYPTION-BASED VALIDATION OF COUPONS

BACKGROUND

It is important for businesses to be able to offer promotions for products. For example, a business may offer a coupon that provides a discount on the purchase price of a particular product. It is also important for businesses to be able to offer specific promotions to specific customers. For example, a business may offer a coupon to a specific customer that provides a purchase discount that only the specific customer can redeem.

However, it can be difficult for businesses to manage and enforce coupons, such as customer-specific coupons. Businesses can find coupon management more difficult in situations where the business does not have, or does not utilize, a live internet connection (e.g., for reliability or security reasons). For example, in some solutions a business must distribute lists of specific coupons, and the associated customers that are authorized to redeem the specific coupons, to each of the business locations (e.g., to each retail store). Even if live internet connections are utilized, retailers may still need to maintain such lists (e.g., at a central location).

It can also be difficult for a business to validate the coupons it receives. For example, a customer could create coupon that the business did not authorize. As another example, a customer could use single use coupon more than once.

Therefore, there exists ample opportunity for improvement in technologies related to managing coupons.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for generating, distributing, redeeming, and validating encrypted coupons. For example, encrypted coupons can be validated offline (e.g., without accessing external networks, such as the internal. In addition, encrypted coupons can be validated without accessing information that identifies associations between unique coupon identifiers and unique customer identifiers.

For example, validation of an encrypted coupon can be performed by receiving the encrypted coupon. The encrypted coupon can be decrypted using a locally available public key. The decrypted coupon can be decoded (e.g., using a pre-defined data format) to extract coupon data. The coupon data can comprise a unique coupon identifier and a unique customer identifier. The decrypted coupon can be validated based, at least in part, upon the unique coupon identifier and the unique customer identifier.

Encrypted coupons can comprise other coupon data in addition to, or instead of, a unique coupon identifier and a unique customer identifier. For example, coupon data can comprise a unique retailer identifier, a unique coupon instance value, and/or other coupon data. Also, other coupon data can be used to perform the validation in addition to, or instead of, a unique coupon identifier and/or a unique customer identifier.

Once an encrypted coupon has been determined to be valid, pricing for items being purchased can be adjusted. For example, a customer can present an encrypted coupon (e.g., at a retail location), have the encrypted coupon validated locally, and have the discount or promotion applied to the purchased items.

DETAILED DESCRIPTION

Overview

Figure 1:
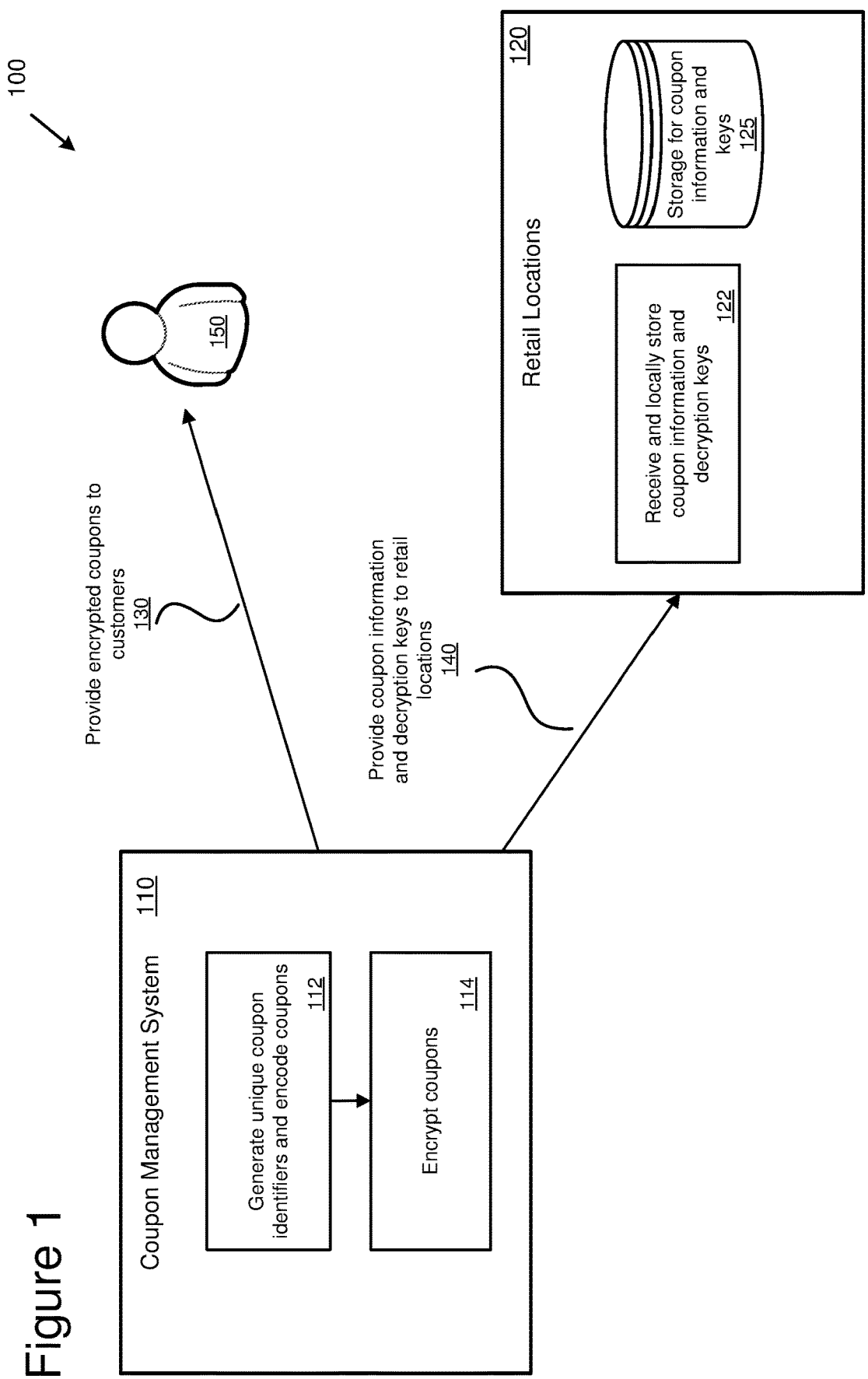
FIG. 1 is a diagram depicting an example environment for generating and distributing encrypted coupons.

The following description is directed to technologies for generating and validating encrypted coupons. For example, an encrypted coupon can be received (e.g., at a retail location). The encrypted coupon can be decrypted using a public key. The decrypted coupon can be decoded (e.g., using a pre-defined data format) to extract coupon data comprising a unique coupon identifier and a unique customer identifier (also called a unique user identifier). The decrypted coupon can be validated based at least in part upon the unique coupon identifier and the unique customer identifier. For example, the decrypted coupon can be validated to determine whether the unique coupon identifier is a valid coupon identifier. In addition, the decrypted coupon can be validated to determine whether the customer (also referred to as the user) presenting the encrypted coupon is the same customer associated with the encrypted coupon (e.g., by matching with the unique customer identifier that is part of the coupon data). The entire process of receiving the encrypted coupon, decrypting the encrypted coupon, decoding the decrypted coupon, and validating the decrypted coupon can be performed offline (e.g., without access to external networks or the internet). The entire process can also be performed without accessing information that identifies associations between unique coupon identifiers and unique customer identifiers.

Validating coupons can be a difficult task for an organization (e.g., a business, such as a retailer) that is selling goods or providing services. In some situations, the organization wants to have the ability to provide coupons that can only be redeemed by particular individuals (e.g., customer-specific coupons). In previous solutions, the organization would have to maintain information (e.g., a list, database, etc.) indicating associations between coupon identifiers (coupon IDs) and customer identifiers (customer IDs). For example, a specific coupon (e.g., coupon ID 123) could be provided to three specific customers (e.g., customer IDs 1, 2, and 3). In order to maintain this list, the organization would have to maintain the following associations:

coupon 123-customer 1
coupon 123-customer 2
coupon 123-customer 3

Therefore, if customer 4 tried to redeem coupon 123, customer 4 could be denied use of coupon 123. In some situations, the organization may be able to maintain the list at a centralized location which is accessible to all of the organization's locations (e.g., all of their retail stores). However, this solution requires that the locations have access to external networks (e.g., the internet) in order to access the coupon association information. Maintaining live external network connections (e.g., live internet connections) can present problems for the organization. For example, external network connections can pose a security risk. In addition, if a location relies on its external network connection to access coupon association information, then if the external network connection goes down customers cannot redeem coupons. For at least these reasons, it can be desirable for organizations to operate locations (e.g., retail stores) in an offline mode where coupons can still be redeemed without needing to use external network resources.

In addition, to ensure that the specific coupon can be redeemed at all of the organization's locations (e.g., all of their retail stores), the coupon association information would have to be replicated to all of the locations. To illustrate the scope of such replication, consider an organization that has 300 valid coupons and each coupon is given to 10,000 customers. The result is 30,000,000 records that have to be replicated and maintained at each of the locations. With a large number of valid coupons and/or a large number of customers, the amount of data that needs to be replicated can be problematic. For example, the business may not be able to replicate the data in real-time. In some solutions, the business replicates the data as a nightly batch. However, if the replication is delayed, then customers will not be able to redeem their coupons (e.g., for a period of time, such as 24 hours).

The technologies described herein provide advantages over such prior solutions in which coupon data is replicated between locations or in which external network connections are needed. For example, using the technologies described herein encrypted coupons can be validated without needing to access information indicating valid coupon and customer associations, which can avoid the need for replicating data to the various locations of the organization. Because validation of encrypted coupons can be performed without replication of coupon-customer associations, network resources (e.g., bandwidth) and computing resources (e.g., processing resources and storage) are saved. In addition, because validation of encrypted coupons can be performed without accessing external networks, network resources (e.g., bandwidth) are saved.

Furthermore, encrypted coupons can be validated using decryption without needing to access any other coupon information. For example, a location can receive an encrypted coupon and decrypt it using a locally available public key. If the coupon decrypts correctly (e.g., if the decrypted coupon has recognizable coupon data fields according to a pre-defined data format), then the coupon can be determined to be a validly created coupon (e.g., a coupon that was created using the corresponding private key).

A coupon refers to a promotion or discount that is applied to the purchase of goods or services. For example, a specific coupon could offer 20% off the purchase price of a specific item. As another example, a specific coupon could be a discount if the customer purchases a specific quantity of an item (e.g., buy three and get the fourth for half off). A coupon has a definition, which can include a name, a description, a picture, pricing or discount rules, and/or other information defining the coupon. A coupon is also associated with a unique coupon identifier that uniquely identifies the coupon (e.g., that uniquely identifies the specific promotion or discount).

Environments for Generating and Distributing Encrypted Coupons

FIG. 1 is a diagram depicting an example environment 100 for generating and distributing encrypted coupons. In the example environment 100, encrypted coupons are generated using a coupon management system 110. The coupon management system 110 can include computing devices (e.g., server computers, desktop computers, database systems, and/or other types of computing devices) and/or software resources supporting the creation, storage, distribution, and management of encrypted coupons.

As depicted at 112, unique coupon identifiers can be generated and encoded using the coupon management system 110. For example, the coupon management system 110 could be used by a retailer to generate unique coupon identifiers for any number of promotions being offered by the retailer. A unique coupon identifier refers to any type of data that can be used to uniquely identify a particular coupon (e.g., a specific promotion being offered by the retailer). For example, a unique coupon identifier can be represented as a sequence of numbers, a string, an alphanumeric sequence, etc. As a simple example, a unique coupon identifier could be represented using a 10-digit number. Once the unique coupon identifiers are generated, they are encoded. The unique coupon identifiers can be encoded alone or in combination with other coupon data (e.g., customer identifiers, retailer identifiers, etc.).

In some implementations, coupons are encoded using a pre-defined data format. The pre-defined data format defines how the coupon data is organized within the encoded coupon. For example, the pre-defined data format can define which data fields are included in the encoded coupon, the order of the data fields, the length of the data fields, encryption information (e.g., type of encryption used), etc. As one example, the pre-defined data format could define an encoded coupon as having a 6-digit retailer identifier, followed by a 10-digit unique coupon identifier, followed by a 20-digit unique customer identifier. The pre-defined data format can be used during encoding when the coupon is created, and the same pre-defined data format can be used during decoding when the coupon is redeemed. For example, the pre-defined data format can be created at a central location and distributed to, and stored at, a number of other locations (e.g., retail locations) for use when decoding coupons received at the other locations.

In some implementations, a coupon is a customer-specific coupon (also called a user-specific coupon). A customer-specific coupon is a coupon that is associated with a specific person (e.g., identified by a unique customer identifier) and that can only be redeemed by the specific person. A customer-specific coupon can be generated by encoding a unique coupon identifier and a unique customer identifier in the coupon. The following is a simplified example of a specific coupon (identified by unique coupon ID 12345) that is being encoded for three specific customers (each having a unique customer identifier), which can be called three different encodings of the same coupon:

| Coupon Identifier | Customer Identifier |
|---|---|
| 12345 | cust700 |
| 12345 | cust452 |
| 12345 | cust870 |

In some implementations, an organization may want to generate coupons that are not customer specific (e.g., that do not have a unique customer identifier field), but that are still unique in the sense that each instance of the coupon can be uniquely identified. For example, such coupons can be given to a number of people, and each coupon can be tracked separately (e.g., so that a person that is given a coupon cannot redeem it more than once). Such coupons, which can be called recipient-specific coupons, can be generated by encoding a unique coupon identifier and a unique coupon instance value in the coupon. The following is a simplified example of four specific instances of a specific coupon (identified by unique coupon ID 678899) that is being encoded:

| Coupon Identifier | Coupon Instance Value |
|---|---|
| 678899 | 0001 |
| 678899 | 0002 |
| 678899 | 0003 |
| 678899 | 0004 |

For example, the coupon instance value can be a counter that is incremented in order to create the desired number of unique instances of the coupon. Each of the recipient-specific coupons can be provided to a different recipient (e.g., regardless of whether the recipient is a user or customer of a specific retailer, and without having to know the identity of the recipient).

In some implementations, an organization may want to generate non-specific coupons that are not customer specific (e.g., that do not have a unique customer identifier field) and that do not have unique instances (e.g., that do not have a unique coupon instance value field). For example, such coupons can be given to any number of recipients (e.g., where tracking of individual coupons is not needed). A non-specific coupon can be generated by encoding a unique coupon identifier (e.g., alone or in combination with other coupon data, such as a retailer identifier). The following is a simplified example of two non-specific coupons that are being encoded:
Coupon Identifier
827361
977238

As depicted at 114, once the coupons have been encoded they are encrypted. In some implementations, the coupons are encrypted with a private key (using public key cryptography). Other implementations can use different types of encryption. Encryption is performed by encrypting the encoded coupon to produce an encrypted coupon. The following is a simplified example of three encrypted coupons that can be generated from the three customer-specific coupons described in the above example:

| Coupon Identifier | Customer Identifier | Encrypted Coupon |
|---|---|---|
| 12345 | cust700 | ASDFGHJKL |
| 12345 | cust452 | ZXCVBNMA |
| 12345 | cust870 | QWERTYUI |

For example, the first customer-specific coupon could be encoded as "12345cust700" and encrypted to produce the encrypted coupon "ASDFGHJKL". Encrypted coupons can be generated similarly for coupons that have other coupon data fields (e.g., retailer ID fields, coupon ID fields, customer ID fields, coupon instance value fields, and/or other coupon data fields). In some implementations the coupon data fields are grouped together (e.g., concatenated) and encrypted as a whole. However, in some implementations the coupon data fields can be encrypted, at least in part, separately.

As depicted at 130, the encrypted coupons are provided to customers 150. The encrypted coupons can be provided to the customers 150 in a variety of formats. For example, the encrypted coupons can be provided in a printed paper format (e.g., a printed barcode) and/or in a digital format (e.g., an emailed QR code). The encrypted coupons can be provided as QR codes, barcodes, sequences of digits, or in another format. Encrypted coupons can also be provided to recipients in addition to, or instead of, to customers 150.

As depicted at 140, coupon information and the decryption key (or keys) are provided to the retail locations 120. The coupon information can include unique coupon IDs, coupon names, descriptions, pricing or discount rules, number of times the coupon can be used, product pictures, and/or other coupon information. In some implementations, the coupon information that is provided to the retail locations 120 does not include associations between unique coupon IDs and unique customer IDs. For example, an organization could have a number of locations (e.g., retail stores in different geographical locations, such as different cities or states). The coupon management system 110 (e.g., at a central location) could be used to generate and encrypt the coupons and deliver the coupon information and decryption keys to each of the organization's locations (e.g., to each of the organization's retail stores). However, the coupon management system 110 does not have to be in a central location, and could be at one of the retail locations or at another location.

In some implementations, the retail locations 120 have access (e.g., via the local data store 125) to the coupon information, including the unique coupon IDs, pricing or discount rules, etc., the public key (or keys), and the unique customer IDs (e.g., via a local customer database). Using this information, the retail locations 120 can locally decrypt, decode, and validate encrypted coupons received from customers 150. The retail locations 120 can perform these tasks offline and without maintaining or accessing information that indicates associations between unique coupon IDs and unique customer IDs.

As depicted at 122, the retail locations 120 receive the coupon data and the decryption keys and store them locally. For example, each of the retail locations 120 can maintain a data store 125 (e.g., a database, data file or files, etc.) for coupon data and keys.

In some implementations, the coupons are encrypted by the coupon management system 110 using a private key. The corresponding public key is then distributed to the retail locations 120. The public key is used by the retail locations 120 when decrypting encrypted coupons received from the customers 150.

In some implementations, coupons can be generated and encrypted at the retail locations 120. For example, a POS at a retail location could generate and provide an encrypted coupon to a customer making a purchase at the retail location. Coupon data could then be provided to other retail locations and/or to central locations (e.g., to use when validating unique coupon identifiers if the encrypted coupons are redeemed at other locations).

While the example environment 100 uses a retailer that has retail locations 120 as an example, the technology is not limited to retailers. The technology can be used by other types of organizations that want to use encrypted coupons (e.g., at physical locations and/or online).

Environments for Offline Validation of Encrypted Coupons

Figure 2:
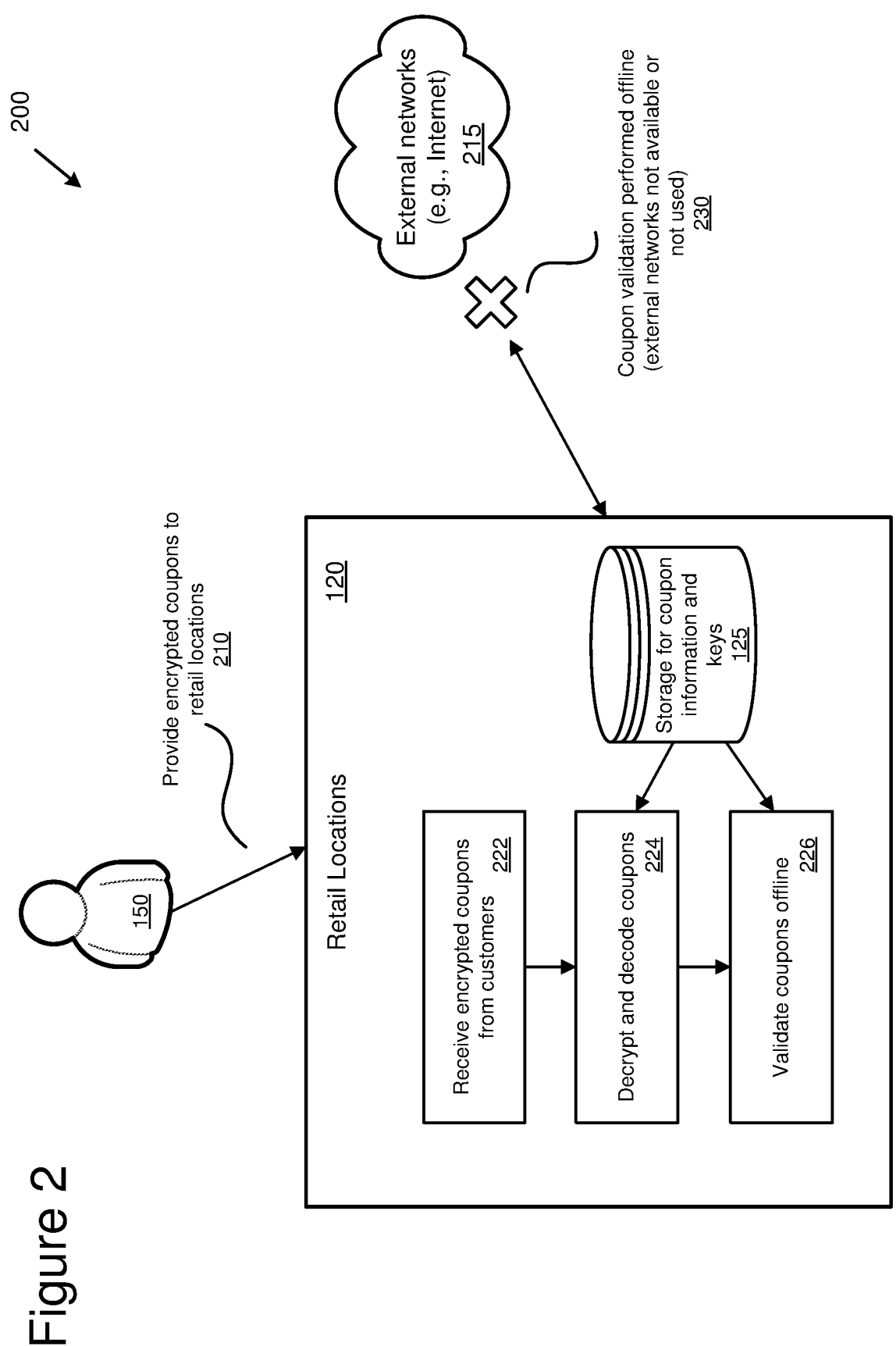
FIG. 2 is a diagram depicting an example environment for offline validation of encrypted coupons.

FIG. 2 is a diagram depicting an example environment 200 for offline validation of encrypted coupons. Specifically, the example environment 200 illustrates operations that are performed when customers 150 provide encrypted coupons to retail locations 120, as depicted at 210. For example, one of the customers 150 can arrive at one of the retail locations 120 to make a purchase (e.g., for a product or service). The customer can present an encrypted coupon (e.g., at checkout). The encrypted coupon can be presented by the customer in the form of a printed coupon (e.g., a printed barcode or QR code) or in the form of a digital coupon (e.g., scanned from the user's phone). For example, a system at the retail location (e.g., a point-of-sale (POS) system) can receive the encrypted coupon from the customer. If the encrypted coupon is presented as a printed coupon (e.g., a QR code or barcode), the printed coupon can be transformed into a digital format (e.g., by the POS system), which can comprise scanning the printed coupon and transforming it into a digital format (e.g., an alphanumeric sequence of characters, such as the previously described example encrypted coupon: ASDFGHJKL).

As depicted at 222, the retail locations 120 receive encrypted coupons from customers 150. In some implementations, the customer also provides customer information (also called user information). For example, the customer can provide a customer card (e.g., a customer loyalty card) or enter a phone number. Based on the provided customer information, the retail location can identify the customer (e.g., retrieve the unique customer identifier associated with the provided customer information from a local data store).

At 224, The encrypted coupons are decrypted and decoded. For example, a received encrypted coupon can be decrypted by obtaining a public key from the data store 125. As a simplified example, the encrypted coupon "ASDFGHJKL" could be received and decrypted to produce the decrypted coupon "12345cust700".

The decrypted coupon can then be decoded. For example, the decrypted coupon can be decoded to extract coupon data comprising a unique coupon identifier. Other coupon data, if present, can be decoded as well, such as a unique retailer identifier, a unique customer identifier, a unique coupon instance value, and/or other coupon data. As a simplified example, the decrypted coupon "12345cust700" could be decoded using a pre-defined data format that specifies decrypted coupons have a 5-digit unique coupon ID followed by a 7-character unique customer ID to produce the coupon data: a unique coupon ID of 12345, and a unique customer ID of cust700.

At 226, the decrypted coupon is validated. Different types of validation can be performed. For example, if the coupon is decrypted successfully using the public key, then the coupon can be determined to be a valid coupon (e.g., a coupon that has been generated by the retailer). Validation can also comprise checking decrypted and decoded coupon data. For example, the unique coupon identifier can be checked against the data store 125 (e.g., matched against valid unique coupon identifiers for coupons stored in the data store 125). Validation can also comprise determining whether the customer that is presenting the encrypted coupon is eligible to redeem the encrypted coupon. For example, a unique customer identifier from the decrypted and decoded coupon data can be checked against customer information provided by the customer. If the unique customer identifier from the coupon matches the unique customer identifier associated with the supplied customer information, then the customer is eligible to redeem the coupon. Validation can also comprise checking a unique coupon instance value. For example, previously redeemed unique coupon instance values can be stored (e.g., in the data store 125).

As depicted at 230, validation of coupons can be performed offline using locally stored data at the retail locations 120. For example, validation can be performed even when the retail locations 120 are not connected (or do not use) external networks 215 (e.g., the internet and/or other external network connections). Offline validation of encrypted coupons can be performed locally by the retail locations 120 based on decryption results (e.g., valid decryption using the stored public key can indicate that the coupon is valid) and/or by the decrypted coupon data (e.g., checking unique coupon identifiers, matching unique customer identifiers to provided customer information, etc.). Offline validation can be performed locally by the retail locations 120 without having to maintain information indicating associations between unique coupon IDs and unique customer IDs.

Upon determining that the encrypted coupon is valid, the coupon can be applied to the customer's purchase. For example, product pricing (e.g., goods and/or services) can be adjusted based upon coupon information (e.g., pricing or discount rules). For example, product pricing adjustments can be applied to products in the customer's basket or shopping cart.

Methods for Offline Validation of Encrypted Coupons

Figure 3:
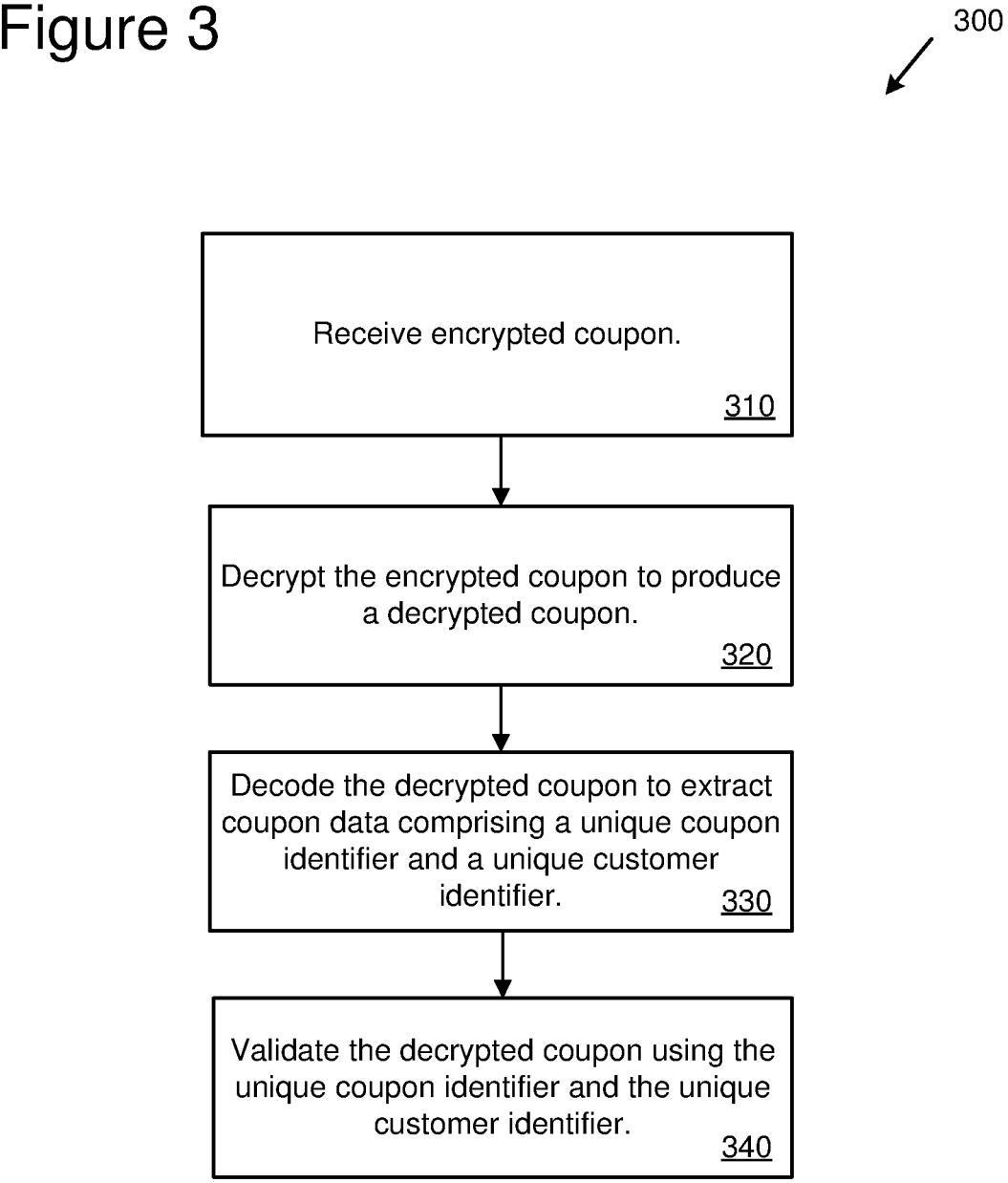
FIG. 3 is a flowchart of an example method for validating encrypted coupons using unique coupon identifiers and unique customer identifiers.

FIG. 3 is a flowchart of an example method 300 for validating encrypted coupons. The example method 300 can be performed by one or more computing devices. For example, the example method 300 can be performed by one or more computing devices running at a location that sells products, such as one of the retail locations 120. The example method 300 can be performed by the one or more computing devices while they are offline (e.g., without accessing external networks, such as the internet).

At 310, an encrypted coupon is received. The encrypted coupon can be provided by a customer (e.g., in printed or digital format).

At 320, The encrypted coupon is decrypted to produce a decrypted coupon. For example, a locally available public key can be used to decrypt the encrypted coupon.

At 330, the decrypted coupon is decoded to extract coupon data. The coupon data can comprise a unique coupon identifier and a unique customer identifier. The coupon data can also comprise additional information, such as a unique retailer identifier. The decrypted coupon data can be decoding using a pre-defined data format. The pre-defined data format can define how the coupon data fields are included (e.g., field ordering, field length, data decoding rules, etc.) in the decrypted coupon.

At 340, the decrypted coupon is validated using the unique coupon identifier and the unique customer identifier. Validation can comprise determining whether the decryption was successful (e.g., whether the encrypted coupon was successfully decrypted using the public key). Validation can comprise checking the decrypted and decoded unique coupon identifier (e.g., matching against a local data store of valid unique coupon identifiers). Validation can comprise checking whether the customer providing the encrypted coupon matches the decrypted and decoded unique customer identifier.

Figure 4:
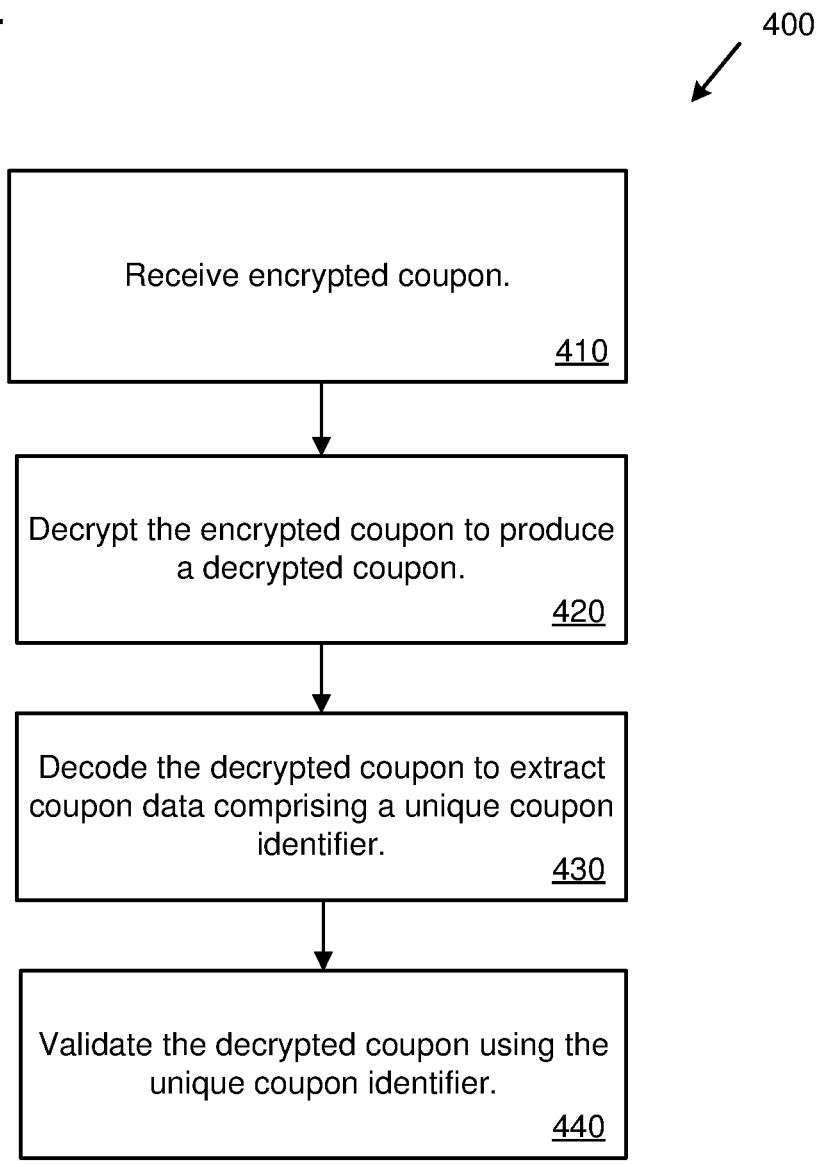
FIG. 4 is a flowchart of an example method for validating encrypted coupons using unique coupon identifiers.

FIG. 4 is a flowchart of an example method 400 for validating encrypted coupons using unique coupon identifiers. The example method 400 can be performed by one or more computing devices. For example, the example method 400 can be performed by one or more computing devices running at a location that sells products, such as one of the retail locations 120. The example method 400 can be performed by the one or more computing devices while they are offline (e.g., without accessing external networks, such as the internet).

At 410, an encrypted coupon is received. The encrypted coupon can be provided by a customer (e.g., in printed or digital format).

At 420, The encrypted coupon is decrypted to produce a decrypted coupon. For example, a locally available public key can be used to decrypt the encrypted coupon.

At 430, the decrypted coupon is decoded to extract coupon data. The coupon data can comprise a unique coupon identifier. The coupon data can also comprise additional information, such as a unique customer identifier and/or a unique retailer identifier. The decrypted coupon data can be decoding using a pre-defined data format. The pre-defined data format can define how the coupon data fields are included (e.g., field ordering, field length, data decoding rules, etc.) in the decrypted coupon.

At 440, the decrypted coupon is validated using the unique coupon identifier. Validation can comprise determining whether the decryption was successful (e.g., whether the encrypted coupon was successfully decrypted using the public key). Validation can comprise checking the decrypted and decoded unique coupon identifier (e.g., matching against a local data store of valid unique coupon identifiers). Validation can comprise checking whether the customer providing the encrypted coupon matches a decrypted and decoded unique customer identifier. Validation can comprise checking a decrypted and decoded unique coupon instance value (e.g., checking whether the unique coupon instance value is valid and/or whether it has been redeemed previously).

Figure 5:
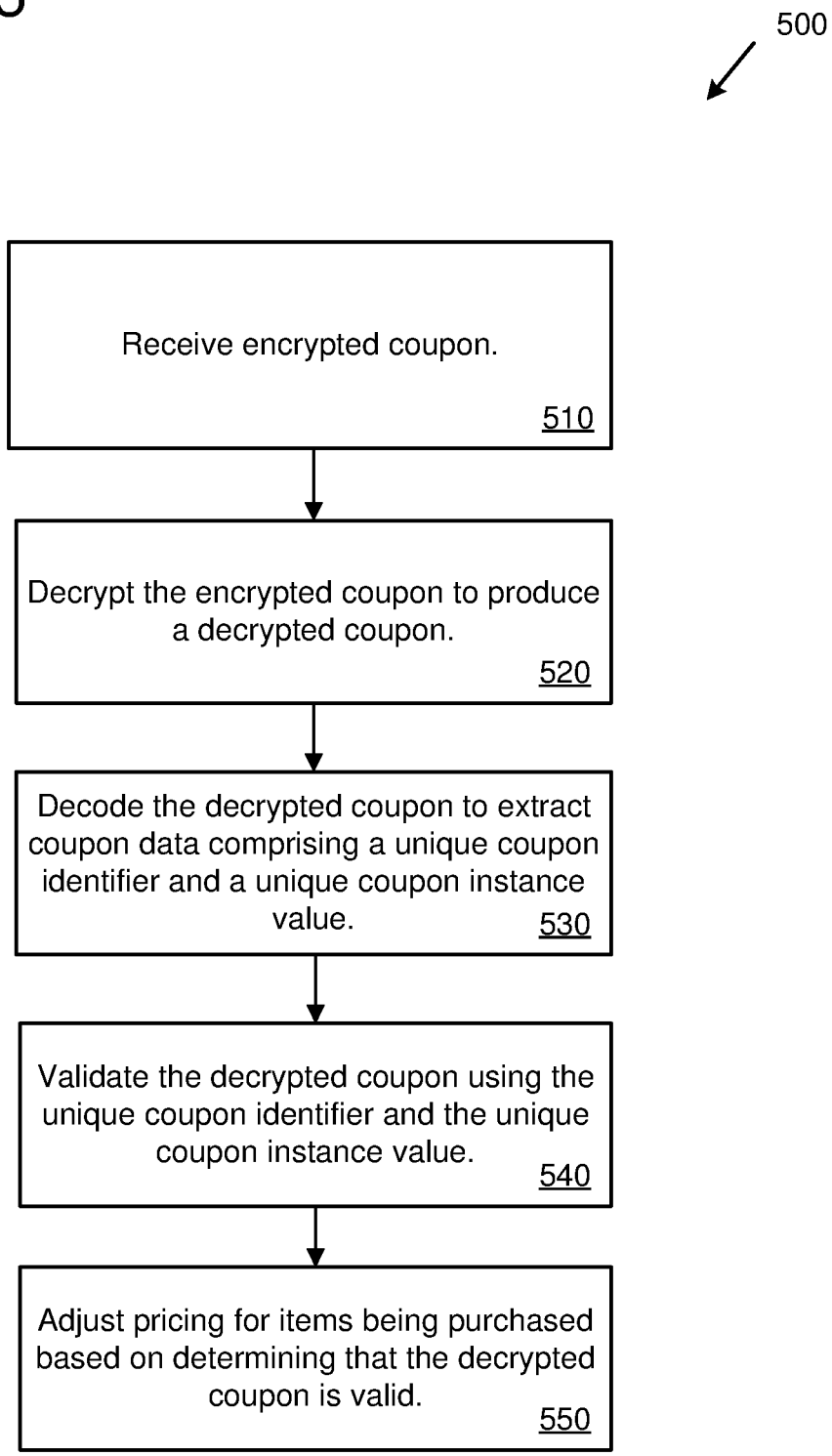
FIG. 5 is a flowchart of an example method for validating encrypted coupons using unique coupon identifiers and unique coupon instance values.

FIG. 5 is a flowchart of an example method 500 for validating encrypted coupons using unique coupon identifiers and unique coupon instance values. The example method 500 can be performed by one or more computing devices. For example, the example method 500 can be performed by one or more computing devices running at a location that sells products, such as one of the retail locations 120. The example method 500 can be performed by the one or more computing devices while they are offline (e.g., without accessing external networks, such as the internet).

At 510, an encrypted coupon is received. The encrypted coupon can be provided by a customer (e.g., in printed or digital format).

At 520, The encrypted coupon is decrypted to produce a decrypted coupon. For example, a locally available public key can be used to decrypt the encrypted coupon.

At 530, the decrypted coupon is decoded to extract coupon data. The coupon data can comprise a unique coupon identifier and a unique coupon instance value. The coupon data can also comprise additional information, such as a unique retailer identifier and/or a unique customer identifier. The decrypted coupon data can be decoding using a pre-defined data format. The pre-defined data format can define how the coupon data fields are included (e.g., field ordering, field length, data decoding rules, etc.) in the decrypted coupon.

At 540, the decrypted coupon is validated using the unique coupon identifier and the unique coupon instance value. Validation can comprise determining whether the decryption was successful (e.g., whether the encrypted coupon was successfully decrypted using the public key). Validation can comprise checking the decrypted and decoded unique coupon identifier (e.g., matching against a local data store of valid unique coupon identifiers). Validation can comprise checking the decrypted and decoded unique coupon instance value (e.g., checking whether the unique coupon instance value is valid and/or whether it has been redeemed previously). Validation can comprise checking whether the customer providing the encrypted coupon matches a decrypted and decoded unique customer identifier. Validation can comprise checking a decrypted and decoded unique retailer identifier (e.g., matching against a local data store of valid unique retailer identifiers).

At 550, pricing for items being purchased are adjusted based on determining that the decrypted coupon is valid. If the decrypted coupon is determined to not be valid, then the pricing can remain unchanged and/or a notification can be presented indicating that the coupon is not valid (e.g., to the customer and/or cashier).

Computing Systems

Figure 6:
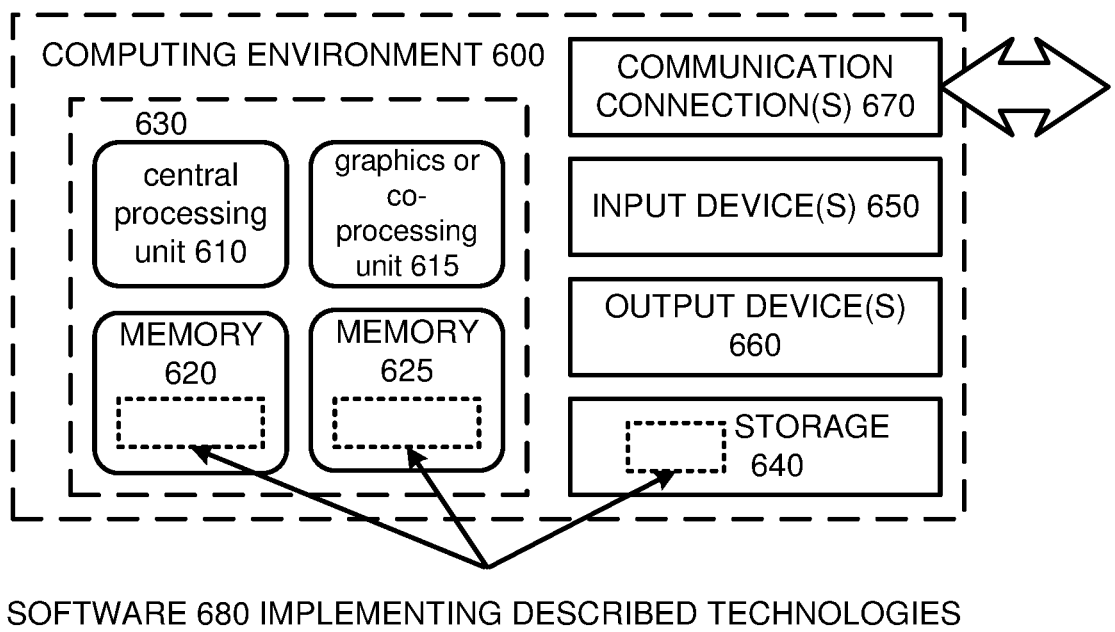
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
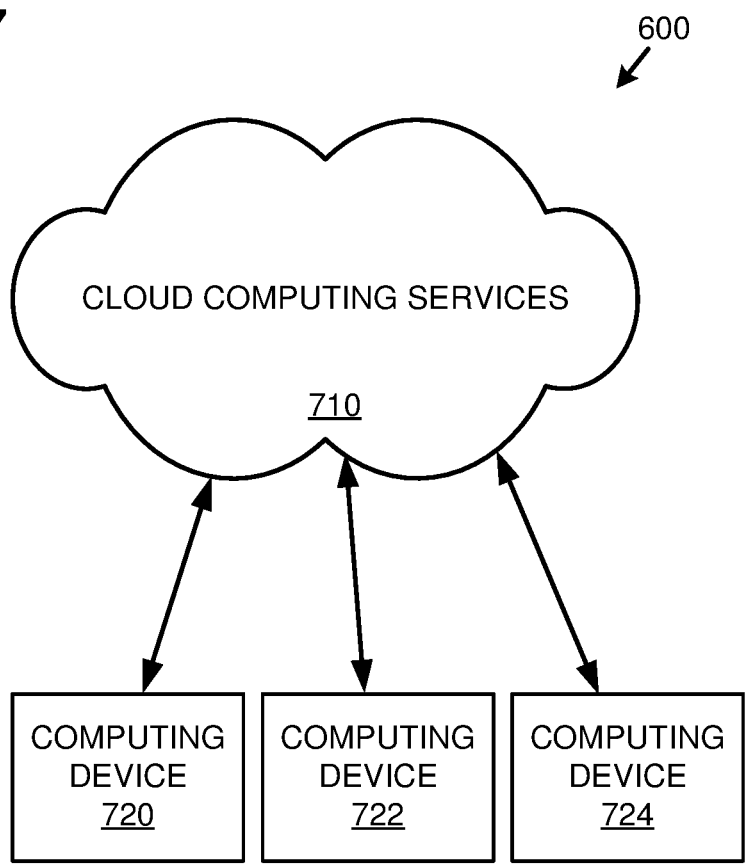
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for validating encrypted coupons, the method comprising:
by the one or more computing devices while offline and without accessing the internet:
receiving an encrypted coupon;
decrypting the encrypted coupon to produce a decrypted coupon, wherein the encrypted coupon is decrypted using a locally available public key;
decoding the decrypted coupon, using a pre-defined data format, wherein the pre-defined data format defines how coupon data is formatted within the decrypted coupon, including order of data fields and length of the data fields, to extract the coupon data comprising:
a unique coupon identifier; and
a unique user identifier; and
validating the decrypted coupon based at least in part upon the unique coupon identifier and the unique user identifier, wherein validating the decrypted coupon comprises:
comparing the data fields that are defined by the pre-defined data format to data fields of the decrypted coupon; and
determining that the encrypted coupon was a validly created encrypted coupon based at least in part upon successful decryption of the encrypted coupon using the public key, wherein decryption is successful when the data fields that are defined by the pre-defined match the data fields of the decrypted coupon;
wherein the decrypted coupon is validated without accessing information indicating valid associations between unique coupon identifiers and unique user identifiers.

2. The method of claim 1, wherein the encrypted coupon is received from a user in a printed paper format, and wherein receiving the encrypted coupon comprises:
transforming the encrypted coupon into a digital format from the printed paper format.

3. The method of claim 1, wherein validating the decrypted coupon further comprises:
comparing the unique coupon identifier to a local data store of valid unique coupon identifiers; and
determining that the decrypted coupon is valid based at least in part upon the unique coupon identifier matching a valid unique coupon identifier stored in the local data store.

4. The method of claim 1, wherein the encrypted coupon is provided by a user making a purchase, and wherein validating the decrypted coupon further comprises:
receiving a unique user identifier associated with the user making the purchase;
comparing the unique user identifier from the decrypted coupon to the unique user identifier associated with the user making the purchase;
determining that the user is eligible to redeem the encrypted coupon when the unique user identifier from the decrypted coupon matches the unique user identifier associated with the user.

5. The method of claim 4, wherein validating the decrypted coupon further comprises:
determining that the user is not eligible to redeem the encrypted coupon when the unique user identifier from the decrypted coupon does not match the unique user identifier associated with the user.

6. The method of claim 1, wherein the coupon data further comprises:
a unique retailer identifier.

7. The method of claim 1, further comprising:
determining product pricing based at least in part upon the validated decrypted coupon; and
applying the determined product pricing to products being purchased by a user presenting the encrypted coupon.

8. The method of claim 1, wherein the one or more computing devices comprise a point of sale device, and where in the encrypted coupon is received by the point of sale device.

9. One or more computing devices comprising:
processors; and
memory;
the one or more computing devices configured, via computer-executable instructions, to perform operations for validating encrypted coupons, the operations comprising:
by the one or more computing devices while offline and without accessing the internet:
receiving an encrypted coupon;
decrypting the encrypted coupon to produce a decrypted coupon, wherein the encrypted coupon is decrypted using a locally available public key,
decoding the decrypted coupon, using a pre-defined data format, wherein the pre-defined data format defines how coupon data is formatted within the decrypted coupon, including order of data fields and length of the data fields, to extract the coupon data comprising:

a unique coupon identifier; and
a unique user identifier; and
validating the decrypted coupon based at least in part upon the unique coupon identifier and the unique user identifier, wherein validating the decrypted coupon comprises:
comparing the data fields that are defined by the pre-defined data format to data fields of the decrypted coupon; and
determining that the encrypted coupon was a validly created encrypted coupon based at least in part upon successful decryption of the encrypted coupon using the public key, wherein decryption is successful when the data fields that are defined by the pre-defined match the data fields of the decrypted coupon;
wherein the decrypted coupon is validated without accessing information indicating valid associations between unique coupon identifiers and unique user identifiers.

10. The one or more computing devices of claim 9, wherein the encrypted coupon is received from a user in a printed paper format, and wherein receiving the encrypted coupon comprises:
transforming the encrypted coupon into a digital format from the printed paper format.

11. The one or more computing devices of claim 9, wherein validating the decrypted coupon further comprises:
comparing the unique coupon identifier to a local data store of valid unique coupon identifiers; and
determining that the decrypted coupon is valid based at least in part upon the unique coupon identifier matching a valid unique coupon identifier stored in the local data store.

12. The one or more computing devices of claim 9, wherein the encrypted coupon is provided by a user making a purchase, and wherein validating the decrypted coupon further comprises:
receiving a unique user identifier associated with the user making the purchase;
comparing the unique user identifier from the decrypted coupon to the unique user identifier associated with the user making the purchase;
determining that the user is eligible to redeem the encrypted coupon when the unique user identifier from the decrypted coupon matches the unique user identifier associated with the user.

13. One or more computer-readable storage media storing computer-executable instructions for execution on one or more computing devices to perform operations for validating encrypted coupons, the operations comprising:
by the one or more computing devices while offline and without accessing the internet:
receiving an encrypted coupon;
decrypting the encrypted coupon to produce a decrypted coupon, wherein the encrypted coupon is decrypted using a locally available public key,
decoding the decrypted coupon, using a pre-defined data format wherein the pre-defined data format defines how coupon data is formatted within the decrypted coupon, including order of data fields and length of the data fields, to extract the coupon data comprising:
a unique coupon identifier; and
a unique user identifier;
validating the decrypted coupon based at least in part upon the unique coupon identifier and the unique user identifier, wherein validating the decrypted coupon comprises:
comparing the data fields that are defined by the pre-defined data format to data fields of the decrypted coupon; and
determining that the encrypted coupon was a validly created encrypted coupon based at least in part upon successful decryption of the encrypted coupon using the public key, wherein decryption is successful when the data fields that are defined by the pre-defined match the data fields of the decrypted coupon; and
based upon determining that the decrypted coupon is valid, adjusting pricing for one or more items being purchased;
wherein the decrypted coupon is validated without accessing information indicating valid associations between unique coupon identifiers and unique user identifiers.

14. The one or more computer-readable storage media of claim 13, wherein validating the decrypted coupon further comprises:
comparing the unique coupon identifier to a local data store of valid unique coupon identifiers; and
determining that the decrypted coupon is valid based at least in part upon the unique coupon identifier matching a valid unique coupon identifier stored in the local data store.

15. The one or more computer-readable storage media of claim 13, the operations further comprising:
comparing the unique coupon instance value to previously redeemed encrypted coupons to determine whether the encrypted coupon has been used previously.

* * * * *